United States Patent
McDonald et al.

(10) Patent No.: US 9,997,014 B2
(45) Date of Patent: Jun. 12, 2018

(54) SERVICE-TRIGGERED GAME EVENTS

(71) Applicant: Microsoft Technology Licensing, LLC, Redmond, WA (US)

(72) Inventors: Cierra D. McDonald, Bothell, WA (US); Michael J. Horstmanshof, Shoreline, WA (US); Sela P. Davis, Seattle, WA (US); Pooja Mathur, Seattle, WA (US); Antonio Vargas Garcia, Bellevue, WA (US); Daniel Av, Kirkland, WA (US); Michael Alyn Miller, Redlands, CA (US); Cody Luitjens, Seattle, WA (US); Craig Suthers, Seattle, WA (US); Nicholas Koller, Seattle, WA (US); Timothy Gill, Kenmore, WA (US); Chad Gibson, Seattle, WA (US); William Michael Zintel, Woodinville, WA (US); Dave Reed, Seattle, WA (US); Doug Beck, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 531 days.

(21) Appl. No.: 13/921,080

(22) Filed: Jun. 18, 2013

(65) Prior Publication Data

US 2014/0274317 A1    Sep. 18, 2014

Related U.S. Application Data

(60) Provisional application No. 61/780,097, filed on Mar. 13, 2013.

(51) Int. Cl.
*A63F 9/24* (2006.01)
*A63F 13/00* (2014.01)
(Continued)

(52) U.S. Cl.
CPC .......... *G07F 17/3225* (2013.01); *A63F 13/12* (2013.01); *G07F 17/3234* (2013.01);
(Continued)

(58) Field of Classification Search
CPC ............ A63F 2300/537; A63F 2300/53; A63F 2300/535
See application file for complete search history.

(56) References Cited

U.S. PATENT DOCUMENTS 7,311,608 B1    12/2007 Danieli et al.
7,780,529 B2    8/2010 Rowe et al.
(Continued)

OTHER PUBLICATIONS

International Preliminary Examining Authority of the European Patent Office, Written Opinion of PCT/US2014/024914, dated Jan. 19, 2015, 6 pages.

(Continued)

*Primary Examiner* — Milap Shah
*Assistant Examiner* — Jason Pinheiro
(74) *Attorney, Agent, or Firm* — Alleman Hall Creasman & Tuttle LLP

(57) ABSTRACT

Various embodiments relating to management of game data of a video game by a game service and service triggered delivery of game data to various subscribers are provided. In one embodiment, game data of a video game is received at a game service computing machine as the video game is being executed on a user gaming machine. A game statistic is generated by the game service computing machine based on the game data. The game statistic is sent to subscribers having a subscription to the game statistic.

15 Claims, 4 Drawing Sheets

(51) Int. Cl.
*G06F 17/00* (2006.01)
*G06F 19/00* (2018.01)
*G07F 17/32* (2006.01)
*A63F 13/30* (2014.01)

(52) U.S. Cl.
CPC ... *A63F 2300/532* (2013.01); *A63F 2300/537* (2013.01); *A63F 2300/558* (2013.01); *A63F 2300/5533* (2013.01); *A63F 2300/5573* (2013.01); *A63F 2300/5586* (2013.01); *A63F 2300/5593* (2013.01); *A63F 2300/634* (2013.01)

(56) References Cited

U.S. PATENT DOCUMENTS

| | | | |
|---|---|---|---|
| 8,066,572 | B1 | 11/2011 | Timmons et al. |
| 8,317,624 | B1 | 11/2012 | Lam |
| 2007/0191102 | A1* | 8/2007 | Coliz ............... A63F 13/12 463/42 |
| 2008/0076573 | A1 | 3/2008 | Loehrer |
| 2008/0146342 | A1 | 6/2008 | Harvey et al. |
| 2009/0176557 | A1* | 7/2009 | Hall .................. A63F 13/12 463/25 |
| 2010/0144444 | A1 | 6/2010 | Graham |
| 2012/0015736 | A1 | 1/2012 | Vanbragt et al. |
| 2012/0136465 | A1 | 5/2012 | Guinn et al. |
| 2012/0225724 | A1 | 9/2012 | Barber et al. |
| 2012/0289330 | A1 | 11/2012 | Leydon et al. |
| 2012/0302354 | A1 | 11/2012 | Thakkar et al. |
| 2012/0315993 | A1 | 12/2012 | Dumont et al. |
| 2013/0005473 | A1 | 1/2013 | Bethke et al. |
| 2013/0012310 | A1 | 1/2013 | Shepard et al. |
| 2013/0035991 | A1* | 2/2013 | Romero ............ G06Q 30/0224 705/14.1 |

OTHER PUBLICATIONS

ISA European Patent Office, International Search Report & Written Opinion for PCT/US2014/024914, dated Jul. 8, 2014, WIPO, 10 Pages.

"Game Center Programming Guide", Apple Inc., http://web.archive.org/web/20121119095908/https://developer.apple.com/library/ios/documentation/NetworkingInternet/Conceptual/GameKit_Guide/GameKit_Guide.pdf, Sep. 19, 2012, 143 pages.

"Bungie.net Technical Case Study", Microsoft, http://msdn.rnicrosoft.com/en-us/library/ms978497.aspx, Jun. 2005, 49 pages.

Huff, Andrew, "Call of Duty Elite App Updated to Support Black Ops II, Includes Live Streaming", Droid Gamers, http://www.droidgamers.com/index.php/apps/4991-call-of-duty-elite-app-updated-to-support-black-ops-ii-includes-live-streaming, Nov. 15, 2012, 11 pages.

Satpathy, Sambit, "Unannounced Google Games Service Revealed in Google Glass Companion App Teardown", BGR Your Mobile Life, http://www.bgr.in/news/unannounced-google-games-service-revealed-in-google-glass-companion-app-teardown/, Apr. 19, 2013, 4 pages.

International Preliminary Examining Authority of the European Patent Office, International Preliminary Report on Patentability Issued in Application No. PCT/US2014/024914, dated Apr. 15, 2015, 7 pages.

* cited by examiner

SERVICE-TRIGGERED GAME EVENTS

CROSS REFERENCE TO RELATED APPLICATIONS

This application claims priority to U.S. Provisional Patent Application No. 61/780,097, entitles CLOUD-TRIGGERED GAME EVENTS, filed Mar. 13, 2013, the entirety of which is hereby incorporated herein by reference.

BACKGROUND

Typically, game data for a video game may be managed internally by the video game. In other words, in-game data processing may be performed locally on a game console as part of video game execution. For example, in-game events, statistics, rewards, etc. may be calculated in a real-time fashion as the video game is being executed on the game console. However, by managing game data internally, a data storage size of the video game may be increased, and additional game console processing resources may be needed to process the game data. Moreover, it may be difficult for companion applications to acquire game data in a real-time fashion from a video game that internally manages game data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to management of game data of a video game by a game service and service triggered delivery of game data to various subscribers are provided. In one embodiment, game data of a video game is received at a game service computing machine as the video game is being executed on a user gaming machine. A game statistic is generated by the game service computing machine based on the game data. The game statistic is sent to subscribers having a subscription to the game statistic.

DETAILED DESCRIPTION

The present disclosure relates to managing game data of a video game with a game service that is not directly and exclusively controlled by the video game. The game service may be configured to calculate game statistics that would traditionally be handled internally by the video game. The game statistics may be calculated based on the game data received from the video game during and/or after execution of the video game, and the game statistics may be stored at the game service away from the video game's direct and exclusive control. More particularly, the present description relates to mechanisms that allow clients, such as the video game and/or a companion application, to receive game data, game statistics, or other information calculated and stored by the game service in a real-time fashion without having to constantly poll for the latest data. For example, real-time may mean at approximately the same time as the information is calculated at the game service, with accommodations for processing and network communications. Such mechanisms allow a game or companion application to receive specific game statistics as defined by a subscription with the game service. By subscribing to a specific game statistic, that game statistic may be forwarded immediately after getting updated at the game service.

Furthermore, the present description relates to mechanisms for tracking rewards and achievements at the game service instead of internally by the video game. Such mechanisms allow game developers to define in-game rewards and reward criteria outside of the game. By defining reward criteria for awarding in-game rewards at the game service, the reward criteria can be modified by the game developers via commands to the game service after the video game has been published without requiring game developers to republish the video game. Moreover, in some embodiments, a user's game statistics may be archived by the game service, and replayed against the modified reward criteria at a later time. Accordingly, a possibility that rewards may be accidentally skipped due to a change in reward criteria may be reduced.

Figure 1:
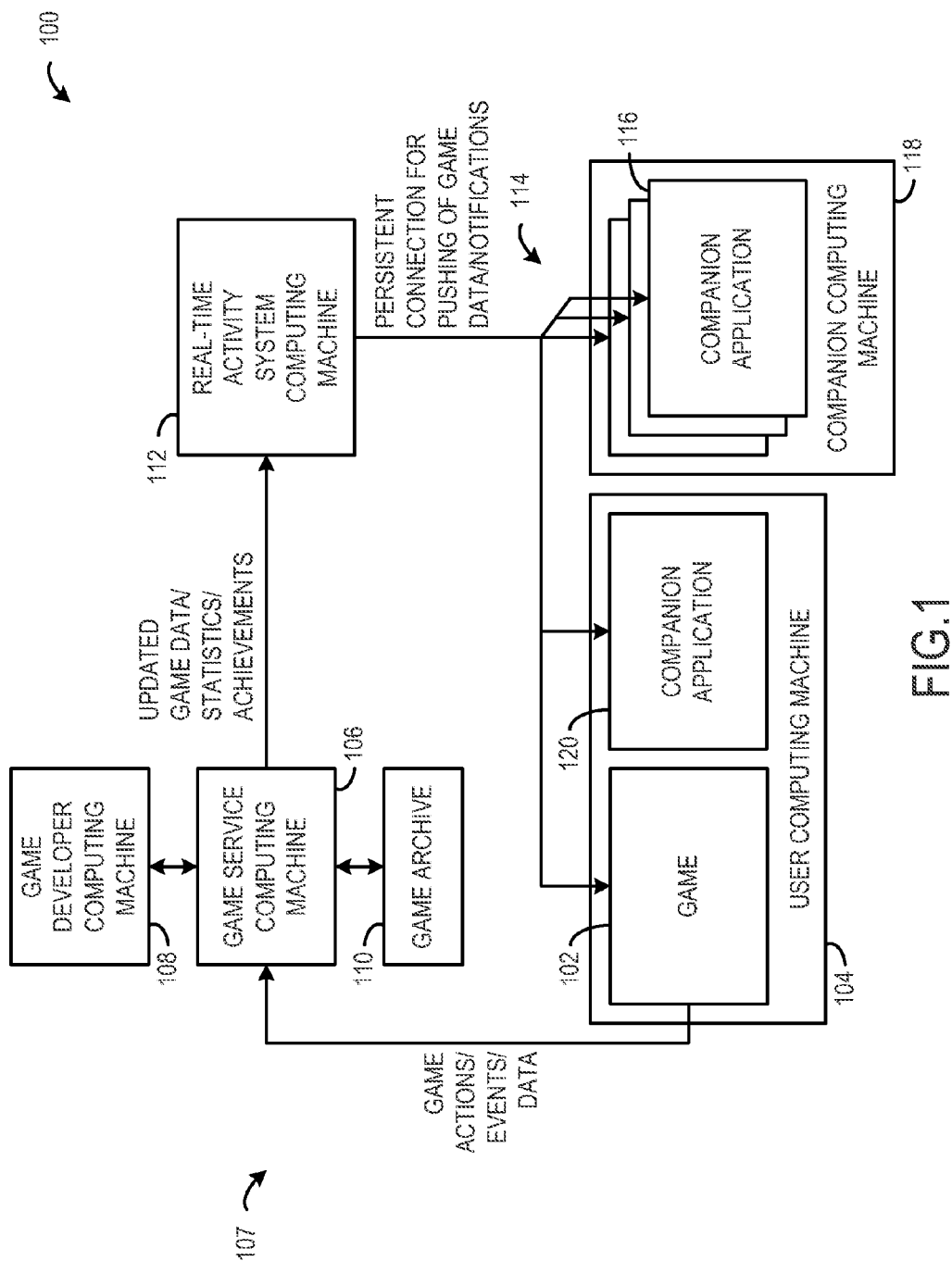
FIG. 1 shows a computing system according to an embodiment of the present disclosure.

FIG. 1 shows a computing system 100 including a video game 102 that may be played by one or more users on a user computing machine 104, such as a game console or other user gaming machine. It is to be understood that the video game may be principally executed on the user gaming machine, as opposed to a platform or server-based game that may be hosted on a server computing machine and merely accessed at a client computing machine, such as via a web browser.

The user computing machine may communicate with a game service computing machine 106 via a network 107, such as the Internet. The game service may be configured to track actions and events that are generated during a course of playing the game (or game execution). In particular, during game play when the video game is being executed on the user gaming machine, the game may send game data, actions, events, and the like to the game service. For example, the game data may include information associated with a game event and the game data may be sent to the game service computing machine substantially in real time in response to occurrence of the game event. The game service may perform calculations and other operations on the game data to generate game statistics or other meaningful information. For example, game statistics may include individual game statistics, game statistics accumulated over time, such as over a plurality of game play sessions, user statistics, game events, attributes of game events, or any other suitable information. For example, real-time may mean at approximately the same time as the game service performs the calculations, with accommodations for processing and network communications.

For example, the game service may track and deliver rewards or achievements to the user based on such game statistics meeting reward criteria. Furthermore, the game service may be configured to add new reward criteria or change existing reward criteria based on changes received from a game developer computing machine 108. For example, after the game is published, the game developer can use the game service to configure new reward criteria or change current reward criteria and an accompanying reward notification message that may be sent to the game without having to update the game code. As such, new rewards can be implemented without forcing users to obtain an updated version of the game. Such mechanisms may be broadly applicable to modify game data or information other than reward criteria without departing from the scope of the present disclosure.

Furthermore, the game service may store the game data and statistics in a game archive 110. For example, the game archive may include a data store that is accessible or in communication with the game service. The game data and statistics may be archived to track a user's game play. For example, the archived game data and statistics can be accessed or replayed over time to adjust a state of the user or the game as criteria changes and to retroactively award rewards (such as power-ups or achievements). It is to be understood that the game archive may store game data on a single game play session basis, and/or as game data aggregated over a plurality of game play sessions.

After calculating the statistics and other information, the game service may be configured to forward the game data, statistics, and other information to a real-time activity system computing machine 112. The real-time activity system may be configured to selectively send the game data, statistics, and other information immediately to a plurality of subscribers 114. Each of the plurality of subscribers may have a subscription that defines which game data the real-time activity system sends to that subscriber.

Such information optionally may be sent through a persistent connection or dedicated channel. For example, each subscriber may establish a persistent Web-Socket connection with the game service (e.g., via the real-time activity system). Once the persistent connection is established, the information may be sent to the subscribers via push notifications, so that the subscribers do not have to continuously poll for information. In some embodiments, the push notifications may be sent via a proprietary or nonproprietary pub/sub protocol. It is to be understood that the subscribers may establish a persistent connection directly with the game service 106 or indirectly with the gaming service by establishing a persistent connection with the real-time activity system 112, and the real-time activity system may pass information to/from the game service. In other words, subscriber may establish a persistent connection with the game service 106 via the real-time activity system 112.

The real-time activity system may be configured to manage the various subscriptions by sending different information as defined by different subscriptions. In some embodiments, each game statistic may have an associated subscription. In some cases, a subscriber may receive particular statistics, game data, or other information as specified by one or more subscriptions. In other words, applications need only subscribe to particular game statistics for which they want to receive update notifications.

In some embodiments, the real-time activity system may be incorporated as part of the game service. In some embodiments, the real-time activity system may be a separate and distinct entity.

Subscribers of the real-time activity system may take any suitable form. For example, the game itself may be a subscriber of the real-time activity system and may receive game statistics, rewards, achievements, etc. as specified by one or more subscriptions. For example, the real-time activity system may deliver reward notification messages to the game, and the game may deliver the in-game reward (such as power-ups or achievements) to the user.

In another example, a subscriber of the real-time activity system may include a companion application 116. For example, a companion application may be an application that is separate from the game and may track various different aspects of the game, game play, or users. In one example, a companion application delivers various game statistics of a game to the user, such as a leader board, player rankings, level-ups, etc. For example, the companion application may deliver the game statistics directly to the user by displaying the game statistics in a user interface. In another example, the game statistics may be delivered to the user indirectly as part of another calculation, or the like. It is to be understood that a companion application may deliver any suitable game statistic to the user in any suitable manner. Likewise, the video game may deliver any suitable game statistic to the user in any suitable manner.

In some cases, the companion application may be executed in parallel with the game. In some cases, the companion application may be executed on the user computing machine. In some cases, the companion application may be executed on a companion device, such as a smartphone, tablet, laptop, or other computing machine.

In the illustrated embodiment, the companion application 116 is one of a plurality of companion applications executed on a companion computing machine 118. Each of these companion applications may provide different functionality and may subscribe to a different set of information from the real-time activity system. Further, a companion application 120 may be executed in parallel with the game 102 on the user computing machine 104. It is to be understood that the companion application 120 may have the same or different functionality as the companion application 116. Further, it is to be understood that in some cases, a companion application may be associated with a single game. In other cases, a companion application may be associated with a plurality of games.

It is to be understood that, in some cases, the companion computing machine may not directly communicate with the user gaming machine or the video game. In one example, the companion application only communicates with the game service.

The above described computing system may enable various mechanisms and method relating to service-triggered game events and game data management as will be discussed in further detail below.

By moving to a model where games are run, at least in part, as a service, information that traditionally has been managed internally by games now may be pushed into the game service. For example, in-game statistics now may be calculated and stored away from the game's control. Accordingly, it is desirable for games to receive that data easily and quickly to build in-game features like real-time player rankings.

Furthermore, game developers have long struggled to get data out of games to make that same data real-time available in companion applications. Developers may want to create companion application that are contextually aware of what is happening within the core game, but this has been difficult to accomplish due to the lack of communication mechanisms between the core games and other applications.

The real-time activity system may be configured to deliver game service-generated game data in real-time to companion applications and/or the game via a persistent connection that the applications and game maintain with the real-time activity system. In some cases, the companion applications or game subscribe to streams of specific data for which they want to receive update notifications as defined by the subscription. Moreover, the companion applications or game may dynamically change the data streams of the subscription as desired. It will be appreciated that a companion application or game may subscribe to service-generated game data for any arbitrary user and/or game. Moreover, a companion application or game may subscribe to any suitable data published by a game or other related service.

In one example, data streams that companion applications can subscribe to may be represented by a uniform resource identifier (URI) that may be determined by a back-end service that generates the information for the data stream. It will be appreciated that any suitable back-end service can publish information to an arbitrary data stream, and any application or game can subscribe to such a data stream to receive data updates. In some cases, an update may include a previous value of a statistic and an updated value of the statistic.

The real-time activity system may include a component configured to communicate with clients and a component configured to communicate with other services. The client communication component (a.k.a., connection server) may be configured to allow clients to connect to the real-time activity system and establish a persistent connection via Web-Sockets or another suitable connection. After that connection is established, the client then has the opportunity to subscribe to specific streams only known by the service via a protocol defined for this system. The real-time activity system stores the subscriptions to determine which connected users should receive updates when back-end services push data into different streams.

The service communication component (a.k.a., activity router) may be configured to route updates to data streams from other services to the connection server where persistent connections have been established with clients and those clients have subscribed to that data stream.

In one example, a player statistics service generates an aggregated value representing the number of miles driven across all game play sessions in a car racing game. This value is calculated in the game service, the game itself does not necessarily know the current value, nor does the game need to calculate the current value. A companion application for the car racing game may subscribe to the "miles driven" calculated value via the real-time activity system. Any time the number of total miles driven changes during game play, the real-time activity system pushes a notification with an updated value of the miles driven statistic to the companion application.

In this example, the companion application may display to the user the value of the total miles driven statistic. The activity flow of the companion application may include establishing a persistent connection to the real-time activity system, and subscribing to the total miles driven statistic. As updates are received from the real-time activity service, the value that gets sent back may be displayed by the user interface. In this example, the player statistic service forwards the data to the real-time activity system after it generates the new value of the statistic.

In another example, a companion application may be a game help application that provides game tips and hints that are specific to the game state. For example, the application may subscribe to game level data and player location data to provide specific hints based on the received game data. In another example, a companion application may be a game map application that shows a position of each player in a game on a map. For example, the application may subscribe to X, Y, Z coordinate data for each player in the game world and may update the location of each player on the map when the coordinate data is pushed to the application.

In some embodiments, the real-time activity system may employ various privacy features. For example, the real-time activity system may restrict subscriptions to a user's data or game data to clients that are approved by the user or game. In one example, a user may restrict subscriptions to the user's data to only clients that are user-confirmed friends of the user, so only the user's friends are allowed to view the user data, subscribe to push notifications of that data, etc.

In another example, similar to the above example, a user may restrict access to the user's data; however that restriction may be overridden when the user participates in a public activity. In one particular example, when a user plays in a multiplayer game with the general public, those members of the public may be able to access the user's private statistics (which are otherwise restricted) while the user is playing the game. The real-time activity system ensures that the user's privacy is respected while at the same time overrides their privacy settings in situations where the user participates in a public activity. It is to be understood that not all private data of the user may be revealed in this case. Rather, only user data that is relevant to the public activity may be revealed. Furthermore, such data may be anonymized, so that the public is unable to determine with which particular user the data is associated.

It will be appreciated that the real-time activity system may be scalable and simple to use by clients. For example, the system may be used by different applications or games across the same computing platform, and not just for one game. Moreover, the real-time activity system may have a custom message protocol designed specifically to easily establish subscriptions and receive updated game data for subscribing clients. Further, the custom message protocol may be designed generic enough for any suitable service to become a publisher.

The configurations described above may enable various methods for managing and distributing game data of a video game. Accordingly, some such methods are now described, by way of example, with continued reference to the above configurations. It is to be understood, however, that these methods, and others fully within the scope of the present disclosure, may be enabled via other configurations as well.

Figure 2:
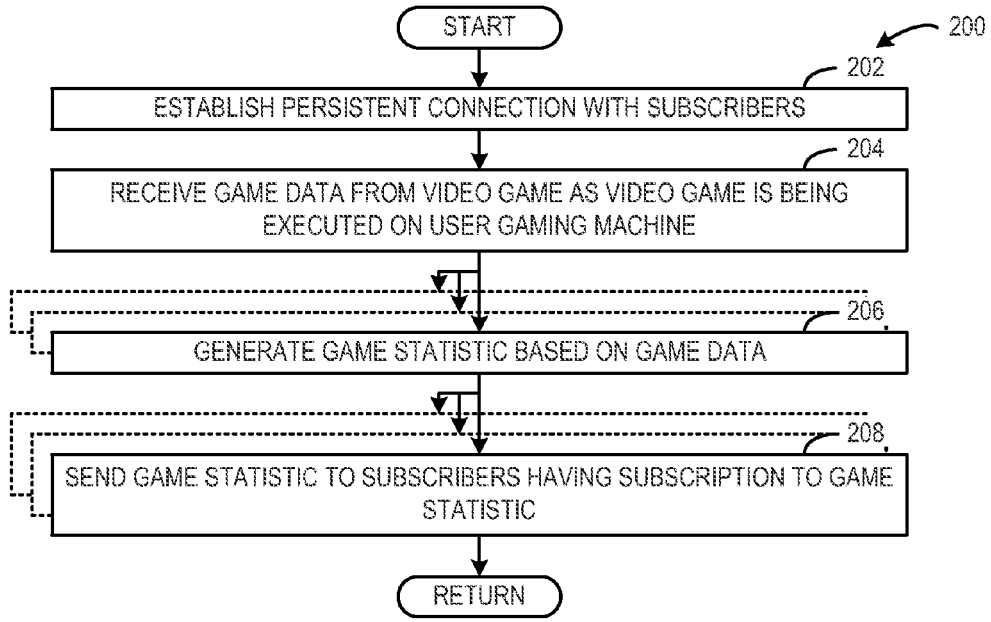
FIG. 2 shows a method for managing game data of a video game at a game service computing machine according to an embodiment of the present disclosure.

FIG. 2 shows a method 200 for managing game data of a video game at a game service computing machine according to an embodiment of the present disclosure. For example, the method 200 may be performed by the game service computing machine 106 (and/or the real-time activity system computing machine 112) shown in FIG. 1.

At 202, the method 200 may include establishing a persistent connection with subscribers. In one example, a persistent connection may be established via Web-Sockets. For example, a subscriber may include any suitable application that attempts to receive updates of a game statistic generated by the game service.

At 204, the method 200 may include receiving game data of a video game as the video game is being executed on a user gaming machine.

At 206, the method 200 may include generating a game statistic based on the game data. In some embodiments, the method may include generating a plurality of game statistics based on the game data. Each game statistic of the plurality of game statistics may have a different subscription.

At 208, the method 200 may include sending the game statistic to subscribers having a subscription to the game statistic. More particularly, if the subscribers have established a persistent connection (e.g., via Web-Sockets), then the game statistic may be sent to the subscribers via the persistent connection. In embodiments where a plurality of game statistics are generated, the method may include for each game statistic, sending that game statistic to subscribers having a subscription to that game statistic.

It is to be understood that, in some cases, the video game may not be aware of the game statistic until the game statistic is pushed to the video game via a subscription.

By calculating the game statistics at the game service instead of internally within the video game, the game statistics may be sent in a real-time fashion to the video game as well as companion applications. Moreover, a data storage foot print of the video game may be made smaller, and processing resources of the user gaming machine may be made available for other uses.

Figure 3:
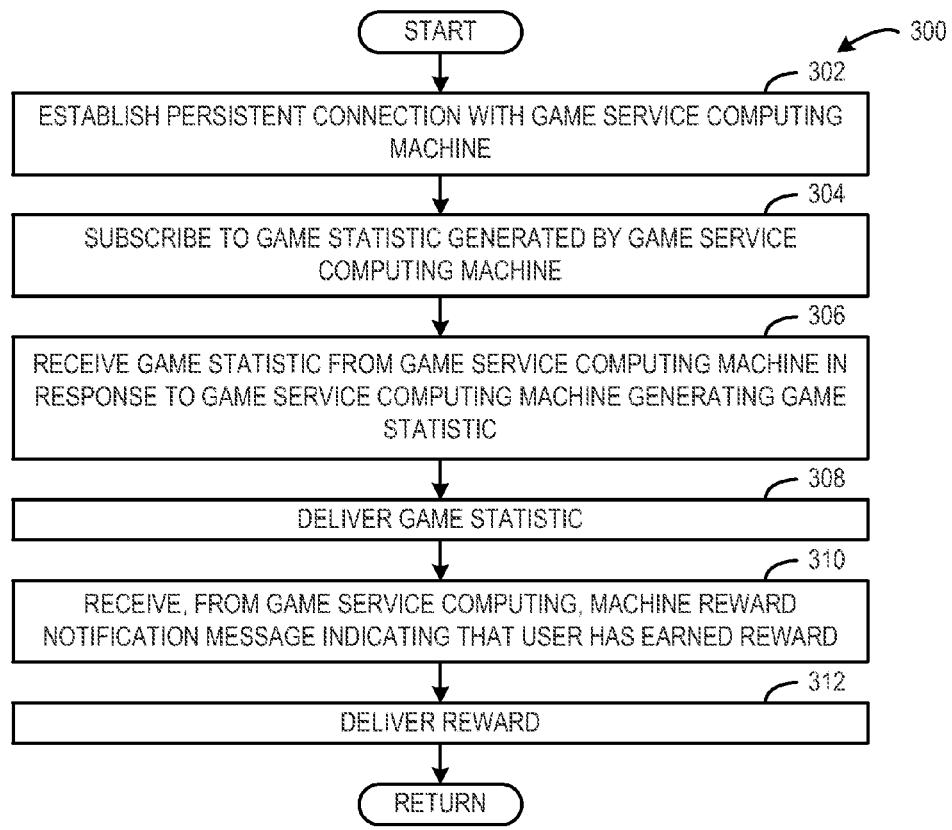
FIG. 3 shows a method of receiving game data of a video game at a companion computing machine according to an embodiment of the present disclosure.

FIG. 3 shows a method 300 of receiving game data of a video game at a companion computing machine according to an embodiment of the present disclosure. For example, the method 300 may be performed by the companion application 116 executed on the companion computing machine 118, the companion application 120 executed on the user computing machine 104, or the video game 102 shown in FIG. 1.

At 302, the method 300 may include establishing a persistent with a game service computing machine. In one example, a persistent connection may be established via Web-Sockets. In some cases, the persistent connection may be established with the game service via the real-time activity system.

At 304, the method 300 may include subscribing to a game statistic generated by the game service computing machine based on game data of a video game. For example, the game data may be received by the gaming service computing machine from a user gaming machine as the video game is being executed on the user gaming machine.

At 306, the method 300 may include receiving the game statistic from the game service computing machine in response to the game service computing machine generating the game statistic. More particularly, if a persistent connection has been established with the game service (e.g., via Web-Sockets), then the game statistic may be received via the persistent connection. In some cases, the game statistic may be received from the game service computing machine via the real-time activity system computing machine.

At 308, the method 300 may include delivering the game statistic. For example, the game statistic may be displayed on the companion application in parallel with the video game being executed on the user gaming machine. In other words, the companion application may deliver the game statistic by displaying the game statistic to supplement game play of the video game.

At 310, the method 300 may include receiving, from the game service computing machine, a reward notification message indicating that a user has earned a reward based on the game statistic meeting reward criteria defined at the game service computing machine. In some cases, the reward notification message may be received from the game service computing machine via the real-time activity system computing machine.

At 312, the method 300 may include delivering the reward.

By subscribing to game statistics via the game service, a companion application may receive the game statistics in a real-time fashion without directly communicating with the video game.

In-game rewards such as powerups, game currency, and special abilities are a very powerful tool used to motivate or aid users in playing a game. Game developers typically allow the user to earn these rewards based on certain criteria that is defined within the game itself. Such rewards criteria may be fixed when the game is published. In order for the developer to modify the criteria or add new criteria, the game code would have to be republished or otherwise modified, which may cause the developer to incur additional costs and/or inconvenience the game player.

As discussed above, the game may send game data to the game service. The game service may be configured to calculate statistics from the game data. Further, the game service may be configured to evaluate the statistics against the rewards criteria and determine whether a reward or achievement should be awarded to the user. If the user has earned a reward based on the reward criteria, the game service triggers a reward event, and a notification is sent to the game indicating that the user has unlocked the reward. In the above described computing system, the event may be forwarded from the game service to the real-time activity system, the real-time activity system may send an event notification to the game, and the game may provide the reward to the user. In some embodiments, the real-time activity system may be omitted from the computing system or incorporated with the game service, and the game service may send the event notification directly to the game or companion application.

In another embodiment, the game service may determine that a user has earned a reward (such as power-up or achievement) and may trigger a reward event without notifying the game. For example, the game service may send the notification to an application that is separate from the game (e.g., a companion application) and tracks a user's rewards. For example, a web page that lists all of a user's rewards.

Because the game service may be configured to track and award achievements and rewards, such mechanisms may be removed from the game code and a data storage footprint of the game may be reduced. Moreover, because the game service is calculating the statistics instead of the game, the game may be executed in a more efficient manner that consumes less local processing resources.

Furthermore, because the in-game reward and achievement criteria are defined in the game service, a game developer may modify the criteria after the game is published in order to tune an existing reward or achievement. In particular, the game service may be configured to track a number and trend of users who attempt to earn various in-game rewards and a number and trend of users who successfully earn the reward. Such tracking information may be used for further game development and criteria adjustment.

For example, if it is determined from game data or player feedback that a reward is too easy to achieve, then the developer may adjust the criteria to increase the difficulty to achieve the reward via the game service without republishing the game code. In one example, in a role playing game, a player may be awarded a golden egg for kicking twenty chickens. However, the developer may determine that the golden egg is awarded to players too frequently. According to the present disclosure, the developer may adjust the criteria via the game service to award a golden egg for kicking fifty chickens instead of twenty chickens. By changing the criteria, a more challenging and enjoyable game play experience may be provided.

Furthermore, because the in-game reward and achievement criteria are defined in the game service, a game developer may add new rewards or achievements via the game service after the game is published without republishing the game. For example, the developer may observe from game data or player feedback that a particular game action is very popular with players of a role playing game, such as kicking a chicken. However, when the role playing game was published there were no achievements associated with the game action of kicking a chicken. The developer may add a new achievement for the role playing game via the game service, such as awarding a golden egg for kicking fifty chickens. By adding a new achievement, a game play experience may be enhanced.

In some embodiments, the game service may be configured to allow a game developer to define a crowd-level challenge and reward. In particular, the game service may be configured to allow game developers to specify that a reward (such as a power-up or achievement) is unlocked when an entire community of players has achieved a certain milestone. In some cases, the milestone may be restricted to a designated period. In one example, the game developer may add a community challenge for a community of players to collectively kick a million chickens over a weekend. Further, the game developer may specify that if the community of players kicks a million chickens, then each member of the community may receive a golden egg. In other words, the game service may enable individual rewards for community-level effort and not just individual rewards for individual effort.

Furthermore, because game data, actions, events, statistics and the like may be archived in the game archive, such information may be accessed or replayed when criteria is changed or new achievements are added. Accordingly, the game service may be configured to retroactively award in-game rewards or achievement to a user as criteria changes.

The handling of in-game rewards and achievements by the game service may differ from a game handling rewards and achievements in a variety of ways. For example, the reward criteria may be defined outside of the game versus within the game itself for a reward that is delivered inside of the game. As another example, notifications to deliver an in-game reward come from outside of the game versus within the game itself. As another example, game data from users is archived outside of the game and can be replayed against the reward criteria to ensure that users receive the in-game rewards they have earned when criteria changes. Such a feature may not be performed by a game because the criteria are fixed when the game is published.

Figure 4:
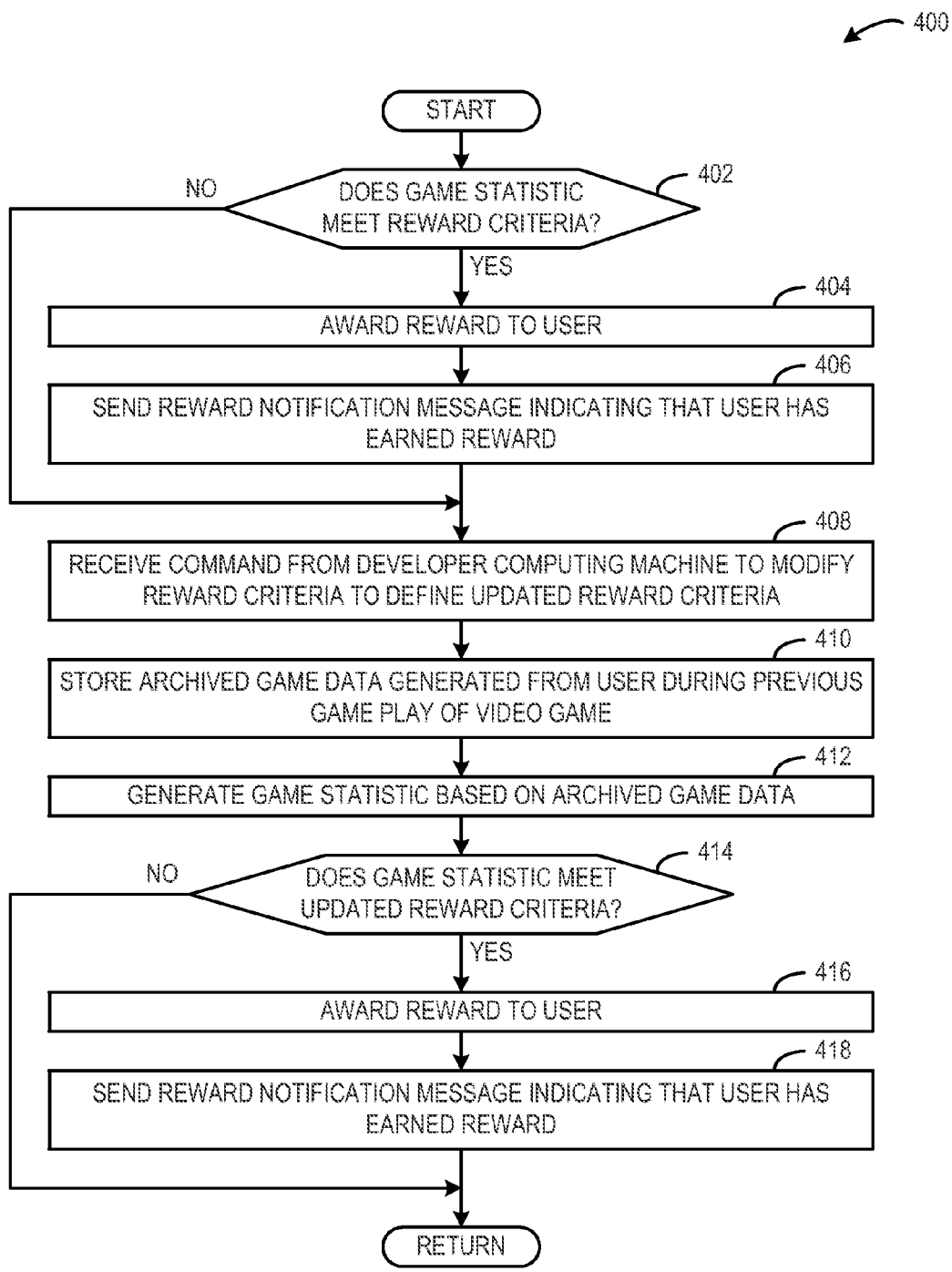
FIG. 4 shows a method of awarding a reward to a user for game play of a video game at a gaming service computing machine according to an embodiment of the present disclosure.

FIG. 4 shows a method 400 of awarding a reward to a user for game play of a video game at a gaming service computing machine according to an embodiment of the present disclosure. For example, the method 400 may be performed by the game service computing machine 106 (and/or the real-time activity system computing machine 112) shown in FIG. 1.

At 402, the method 400 may include determining if a game statistic meets reward criteria defined at a game service computing machine. The game statistic may be generated at the game service computing machine. The game statistic may be generated based on game data received from the video game as the video game is being executed on a user gaming computing machine. For example, the reward criteria may be defined by a game developer via commands sent to the game service. If the game statistic meets the reward criteria, then the method 400 moves to 404. Otherwise, the method 400 moves to 408.

At 404, the method 400 may include awarding a reward to a user.

At 406, the method 400 may include sending, to the video game, a reward notification message indicating that the user has earned the reward. Further, the video game may then deliver the in-game reward to the user (e.g., by displaying the reward in a user interface). In some embodiments, the method may include sending, to a companion application, the reward notification message, and the companion application may deliver the reward to the user.

At 408, the method 400 may include receiving a command from a developer computing machine to modify the reward criteria to define updated reward criteria.

At 410, the method 400 may include storing archived game data generated for the user during previous game play of the video game.

At 412, the method 400 may include generating the game statistic based on the archived game data.

At 414, the method 400 may include determining whether the game statistic meets the updated reward criteria. If the game statistic meets the updated reward criteria, then the method 400 moves to 416. Otherwise, the method 400 returns to other operations.

At 416, the method 400 may include awarding the reward to the user.

At 418, the method 400 may include sending, to the video game, a reward notification message indicating that the user has earned the reward.

By managing rewards at the game service instead of internally within the video game, the reward criteria may be updated after the video game is published without requiring a user to acquire a new version of the video game.

Figure 5:
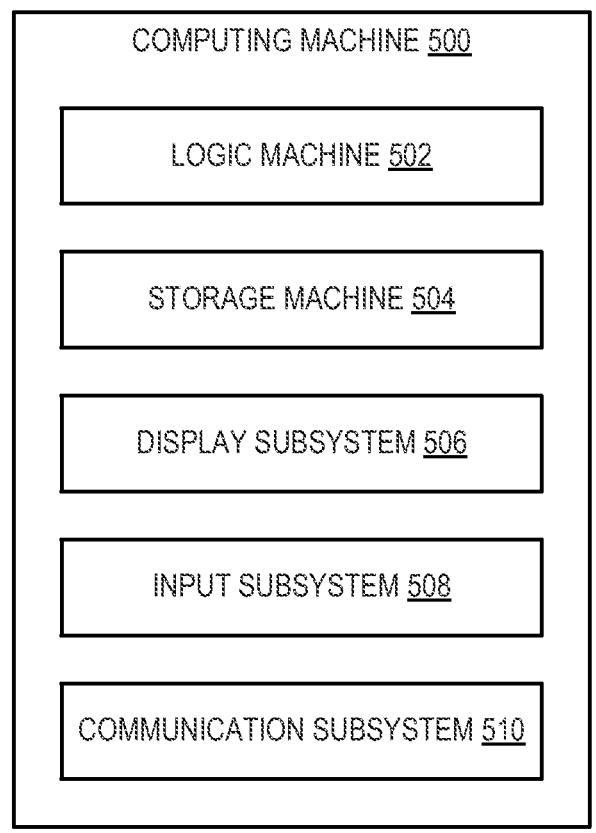
FIG. 5 shows a computing system according to an embodiment of the present disclosure.

FIG. 5 schematically shows a non-limiting embodiment of a computing system 500 that may be representative of various computing machines of the computing system 100 shown in FIG. 1. For example, the computing system 500 may be representative of the user computing machine 104, the game service computing machine 106, the developer computing machine 108, the real-time activity system 112, or the companion computing machine 118 shown in FIG. 1. Computing system 500 is shown in simplified form. Computing system 500 may take the form of one or more personal computers, server computers, tablet computers, home-entertainment computers, network computing devices, gaming consoles, mobile gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a service-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, may be one or more application programs executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods, processes, and activity flows change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of managing game data of a video game, at a game service computing machine, the method comprising:
   prior to release of the video game for execution on a user gaming machine, defining initial reward criteria for awarding a reward to a user;
   receiving, from the user gaming machine via a computer network, game data of the video game as the video game is being executed on the user gaming machine;
   computer-generating a game statistic for the video game based on the game data;
   sending, via the computer network, the game statistic to the video game and other subscribers having a subscription to the game statistic;
   if the game statistic meets the initial reward criteria, awarding the reward to the user;
   sending, via the computer network, to the video game, a reward notification message indicating that the user has earned the reward based on the initial reward criteria;
   after release of the video game for execution on the user gaming machine, receiving, via the computer network, a command from a developer computing machine different than the user gaming machine to modify the initial reward criteria to define updated reward criteria;

if the game statistic meets the updated reward criteria, awarding the reward to the user; and sending, via the computer network, to the video game, a reward notification message indicating that the user has earned the reward based on the updated reward criteria.

2. The method of claim 1, further comprising:

storing, via a storage machine of the game service computing machine, archived game data generated for the user during previous game play of the video game;

generating the game statistic based on the archived game data;

if the game statistic generated from the archived game data meets the updated reward criteria, awarding the reward to the user; and sending, via the computer network, to the video game, the reward notification message indicating that the user has earned the reward.

3. The method of claim 1, wherein the game data includes information associated with a game event and the game data is sent to the game service computing machine substantially in real time in response to occurrence of the game event.

4. The method of claim 1, wherein the other subscribers include a companion application.

5. The method of claim 4, wherein the companion application is executed on the user gaming machine.

6. The method of claim 4, wherein the companion application is executed on a companion computing machine that is different than the user gaming machine.

7. The method of claim 1, further comprising:

establishing a persistent connection with the video game and the other subscribers over the computer network, and wherein the game statistic is sent to the video game and the other subscribers via the persistent connection.

8. A method of managing game data of a video game, at a game service computing machine, the method comprising:

receiving, from a user gaming machine via a computer network, game data of the video game as the video game is being executed on the user gaming machine;

computer-generating a plurality of different game statistics corresponding to different aspects of the video game based on the game data, wherein each different game statistic of the plurality of different game statistics has a different subscription;

receiving, via the computer network on behalf of the video game, a subscription to a first set of game statistics selected from the plurality of different game statistics;

receiving, via the computer network on behalf of a companion application executing on the user gaming machine, a subscription to a second set of game statistics selected from the plurality of different game statistics and different from the first set;

sending, via the computer network, the first set of game statistics to the video game; and sending, via the computer network, the second set of game statistics to the companion application.

9. The method of claim 8, further comprising:

for each different game statistic, if that different game statistic meets reward criteria defined at the game service computing machine, awarding a reward to a user; and sending, via the computer network, to the video game, a reward notification message indicating that the user has earned the reward.

10. The method of claim 8, further comprising:

establishing a persistent connection over the computer network with the user gaming machine, and wherein the first and second sets of game statistic are received from the game service computing machine via the persistent connection.

11. The method of claim 8, wherein the game data includes information associated with one or more game events and the game data is sent to the game service computing machine substantially in real time in response to occurrence of the one or more game events.

12. A method of receiving game data of a video game, at a user gaming machine, the method comprising:

during execution of a video game on the user gaming machine, sending, via a computer network, game data for the video game to a game service computing machine;

subscribing, on behalf of the video game, to a first set of game statistics selected from a plurality of different game statistics for the video game and corresponding to different aspects of the video game, the plurality of different game statistics being generated by the game service computing machine based on the game data;

subscribing, on behalf of a companion application, to a second set of game statistics selected from the plurality of different game statistics and different from the first set;

receiving, via the computer network, the first set and the second set of different game statistics from the game service computing machine based on the game service computing machine generating the plurality of different game statistics;

executing the video game on the user gaming machine using the first set of game statistics; and during execution of the video game on the user gaming machine, executing the companion application on the user gaming machine using the second set of game statistics.

13. The method of claim 12, further comprising:

establishing, via the computer network, a persistent connection with the game service computing machine, and receiving, via the computer network, the first and second sets of game statistics from the game service computing machine via the persistent connection.

14. The method of claim 12, further comprising:

receiving, via the computer network, from the game service computing machine, a reward notification message indicating that a user has earned a reward based on at least one of the set of game statistics meeting reward criteria defined at the game service computing machine; and delivering the reward.

15. The method of claim 12, further comprising:

visually presenting, via a display, the second set of different game statistics in the companion application during execution of the video game on the user gaming machine.

* * * * *